(12) United States Patent
Tapie et al.

(10) Patent No.: US 8,711,886 B2
(45) Date of Patent: *Apr. 29, 2014

(54) TRANSMITTING A SYNCHRONIZING SIGNAL IN A PACKET NETWORK

(75) Inventors: Thierry Tapie, Rennes (FR); Serge Defrance, Rennes (FR); Bertrand Huguies, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 358 days.

This patent is subject to a terminal disclaimer.

(21) Appl. No.: 12/225,055

(22) PCT Filed: Mar. 13, 2007

(86) PCT No.: PCT/FR2007/050918
§ 371 (c)(1),
(2), (4) Date: Feb. 4, 2009

(87) PCT Pub. No.: WO2007/104891
PCT Pub. Date: Sep. 20, 2007

(65) Prior Publication Data
US 2009/0175271 A1 Jul. 9, 2009

(30) Foreign Application Priority Data

Mar. 13, 2006 (FR) ..................... 06 50837

(51) Int. Cl.
*H04J 3/06* (2006.01)
*H04J 3/07* (2006.01)
*H04J 3/00* (2006.01)
*H04N 21/43* (2011.01)
*H04N 21/242* (2011.01)
*H04N 21/8547* (2011.01)

(52) U.S. Cl.
CPC ......... *H04N 21/4305* (2013.01); *H04N 21/242* (2013.01); *H04N 21/8547* (2013.01)

USPC ........... 370/516; 370/503; 370/507; 370/506; 370/509; 370/517; 370/519; 348/512; 348/513; 348/514; 348/516; 348/518; 348/519; 348/521

(58) Field of Classification Search
CPC ............ H04N 21/242; H04N 21/4305; H04N 21/64322; H04N 21/8547
USPC ....................... 370/389; 375/240.28; 348/512
See application file for complete search history.

(56) References Cited

U.S. PATENT DOCUMENTS 4,059,040 A * 11/1977 Obayashi et al. ............... 84/648
6,191,821 B1 * 2/2001 Kupnicki ..................... 348/512

(Continued)

FOREIGN PATENT DOCUMENTS

EP 1471745 10/2004

OTHER PUBLICATIONS

Search Report Dated Sep. 18, 2007.

*Primary Examiner* — Ayaz Sheikh
*Assistant Examiner* — Tarell Hampton
(74) *Attorney, Agent, or Firm* — Tutunjian & Bitetto, P.C.

(57) ABSTRACT

The invention concerns a device for transmitting packets in a packet communication network comprising at least two stations, characterized in that it includes means for:
extract image cues from a synchronizing signal,
initializing a first counter based on said image cues,
initializing a second counter every "m" zero crossing of the first counter,
sampling the second counter at all the $T_{ech}$ periods, where $T_{ech}$ is derived from a time base synchronized on all the network stations, and
transmitting packets containing the samples in the network.
The invention also concerns a device for receiving packets in a packet communication network comprising at least two stations.

12 Claims, 11 Drawing Sheets

(56) References Cited

U.S. PATENT DOCUMENTS

| | | | |
|---|---|---|---|
| 6,330,285 B1* | 12/2001 | Crosby et al. | 375/240.28 |
| 6,859,460 B1* | 2/2005 | Chen | 370/412 |
| 2002/0173322 A1* | 11/2002 | Turetzky et al. | 455/502 |
| 2004/0012578 A1* | 1/2004 | Naegle | 345/204 |
| 2004/0085906 A1* | 5/2004 | Ohtani et al. | 370/248 |
| 2004/0125868 A1* | 7/2004 | Keller et al. | 375/150 |
| 2004/0257369 A1* | 12/2004 | Fang | 345/501 |
| 2005/0237434 A1* | 10/2005 | Takatori et al. | 348/725 |
| 2007/0064811 A1* | 3/2007 | Zador et al. | 375/240.26 |

* cited by examiner

TRANSMITTING A SYNCHRONIZING SIGNAL IN A PACKET NETWORK

This application claims the benefit, under 35 U.S.C. §365 of International Application PCT/FR2007/050918, filed Mar. 13, 2007, which was published in accordance with PCT Article 21(2) on Sep. 20, 2007 in English and which claims the benefit of French patent application No. 0650837 filed Mar. 13, 2006.

The present invention relates to the domain of video equipment.

The present invention relates more particularly to an emitter device and a receiver device for the transmission of a synchronisation signal, for example of "Genlock" type (synchronisation locking), on a packet communication network, of for example IP (Internet Protocol) type.

PRIOR ART

In the prior art, the synchronisation of items of video equipment (cameras, etc.) in a studio was carried out by transmission of a synchronisation signal commonly called "Genlock" or "Black burst" as shown in FIG. 1.

This signal is routed to various items of equipment to be synchronised by a coaxial cable. Nothing else travels along this cable. This transmission mode ensures a constant transmission delay without "jitter". From this signal, all items of equipment are able to reconstruct a cadence clock that is specific to its functioning and that guarantees that all images generated by this latter will be rigorously in phase with all of the images of the neighbouring items of equipment. Typically, two cameras each generate a video with a different content but rigorously in phase and frequency with one another, as shown in FIG. 2.

The inconvenience of these systems of the prior art is the use of a specific coaxial cable.

One of the objectives of the present invention is to replace the coaxial cable with an IP/Ethernet link.

However, an IP/Ethernet network, introduces a strong jitter in the transmission in a known manner. The problem that is posed is that consisting in the transmission of an image synchronisation cue via an IP/Ethernet network rigorously in phase with the transmission and perfectly synchronised with the clock of the reception side. This means finding a means of permitting generation on a remote item of equipment connected to an IP network, introducing jitter and latency, a video clock and an image synchronisation cue. These two signals enable regeneration of a Genlock signal rigorously in phase with the Genlock signal on the transmission side.

In fact, the transmission of the Genlock signal is carried out on IP/Ethernet in the studios, as shown in FIG. 3. The video transmission already exists on IP. There remains nothing less than succeeding in synchronizing the cameras (or other equipment) with identical constraints with respect to the use of the coaxial cable. However on IP/Ethernet, the transmission delay can vary, the jitter is very large with respect to the video constraints.

The prior art knows, through the European patent application EP 1 471 745 (Sony) a video synchronisation method. This European patent application describes a method to synchronise the phase of an local image synchronisation signal generator to a data processor in communication with network commuted by asynchronous packets with the phase of a reference image synchronisation signal generator of a reference video data processor also linked to the network, the local processor and the reference processor having respective clocks, the local image synchronisation signal generator and the reference image synchronisation signal generator generate synchronous periodic image synchronisation signals with the reference and local clocks, comprising respectively the following stages:

frequency synchronisation of local and reference clocks,
sending by the reference data processor, via the network, to the local data processor of an image temporal packet providing the reference image synchronisation data indicating the temporal difference, measured with respect to the reference processor clock, between the instant when the image temporal packet is sent on the network and the instant of production of the reference image synchronisation signal, and
control by the local processor of the moment when the local image synchronisation signal is produced, according to the reference image synchronisation data and the instant of arrival of the temporal packet.

The method that is the object of this European patent application relates to a packet-switched network, but with a constant transmission speed. In addition, in this method, the packets are emitted at determined instants according network availability and sampling takes place during the transmission of the packet.

SUMMARY OF THE INVENTION

The technical problem that the present invention proposes to resolve is the transmission of a synchronisation signal in a packet-switched network having a non-constant transmission time.

For this purpose, the present invention concerns, according to a first aspect, a device able to emit packets in a packet communication network comprising at least two stations, characterized in that it comprises the means to:
extract image cues from a synchronisation signal,
initialise a first counter from said image cues,
initialise a second counter every "m" passages through zero of the first counter,
sample the second counter at every $T_{ech}$ period, where $T_{ech}$ is from a time base synchronised on all the stations of said network, and
emit packets containing the samples in the network.

Preferably, m is a natural integer greater than or equal to two.

Advantageously, the synchronisation signal is of the Genlock type.

According to an embodiment, the second counter is a PCR (Program Clock Reference) counter.

The first counter on the transmission side can be a 40 ms counter.

According to a particular implementation, the time base synchronised on all the stations is of the IEC 61588 type.

The present invention relates, according to a second aspect, to a device able to receive packets in a packet communication network comprising at least two stations, characterized in that it comprises the means to:
receive packets containing samples from said network, said samples coming from data sampled every $T_{ech}$ period, where $T_{ech}$ is from a time base synchronised on all the stations of said network,
regenerate a first counter using a phase locking loop,
initialise a second counter at every passage through zero of said first counter,
generate image cues at every passage through zero of the second counter, and
reconstitute a synchronisation signal from said image cues.

Preferably, the synchronisation signal is of the Genlock type.

According to an embodiment, the first counter is a PCR (Program Clock Reference) counter.

The second counter on the reception side can be a 40 ms counter.

According to a particular implementation, the time base synchronised on all the stations is of the IEC 61588 type.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

Figure 1:
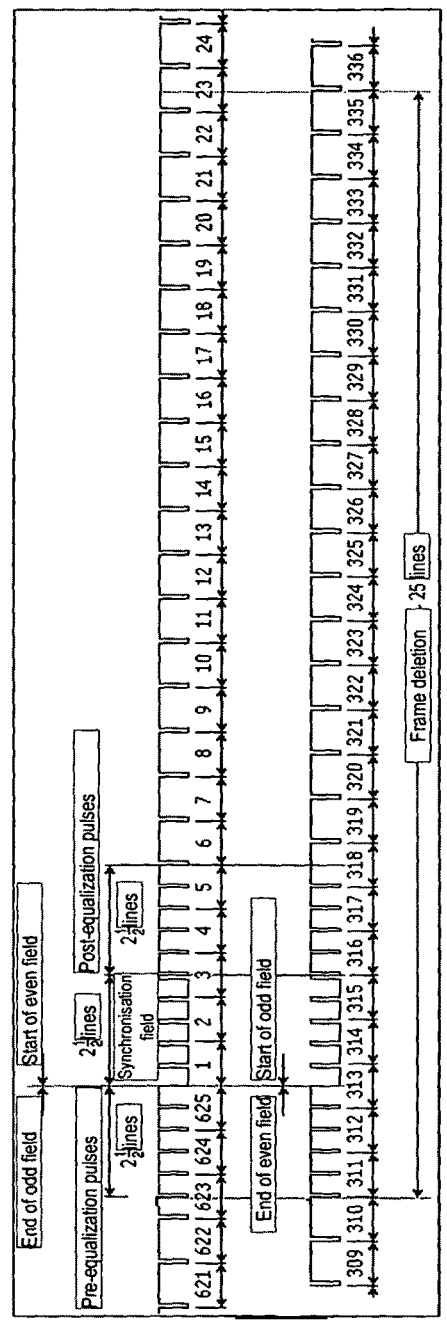
FIG. 1 shows an analogue genlock signal.
Figure 2:
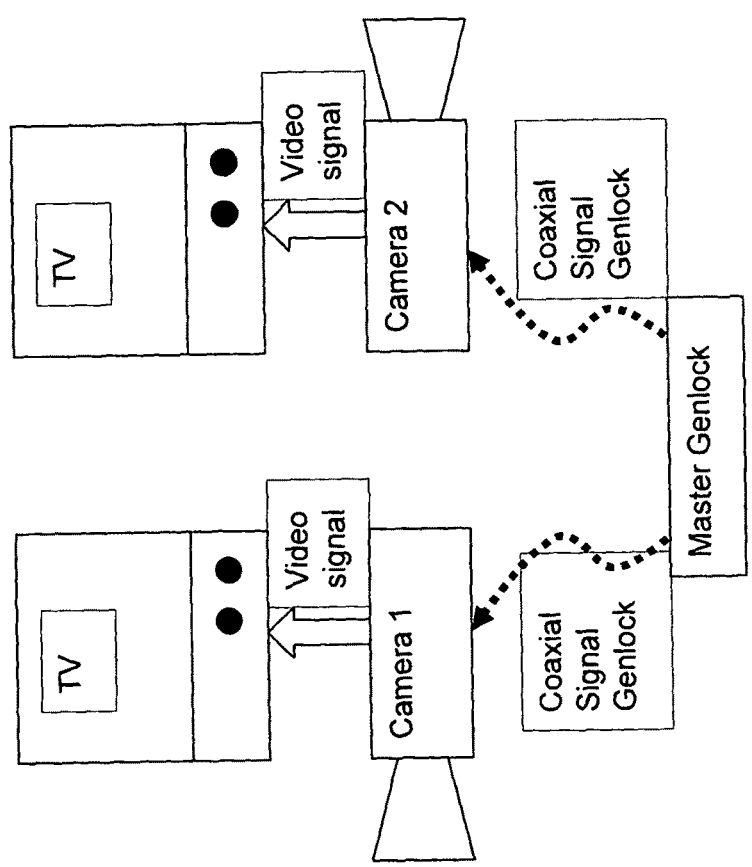
FIG. 2 shows the transmission of a genlock signal by coaxial cable.
Figure 3:
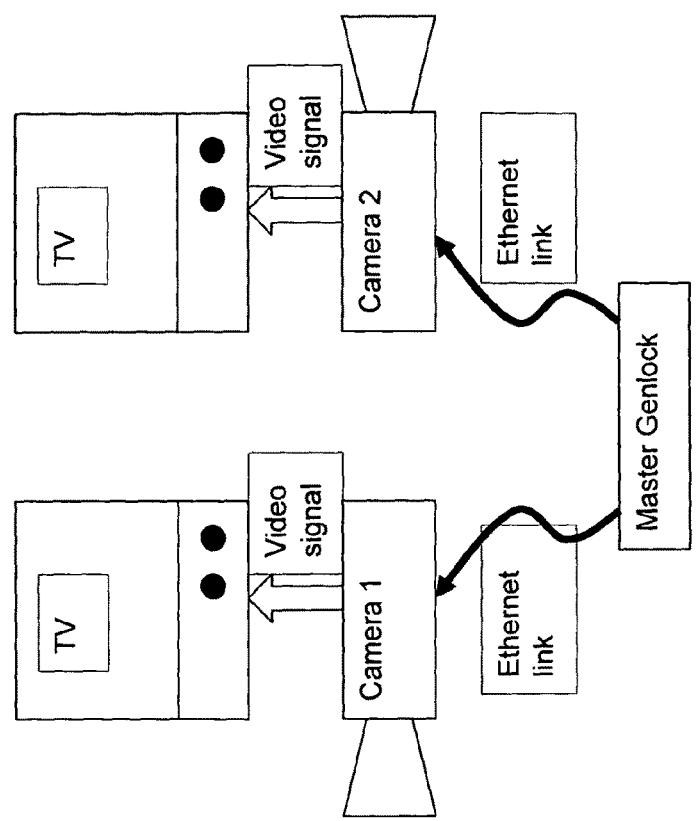
FIG. 3 shows the transmission of genlock information via an IP/Ethernet network.
Figure 4:
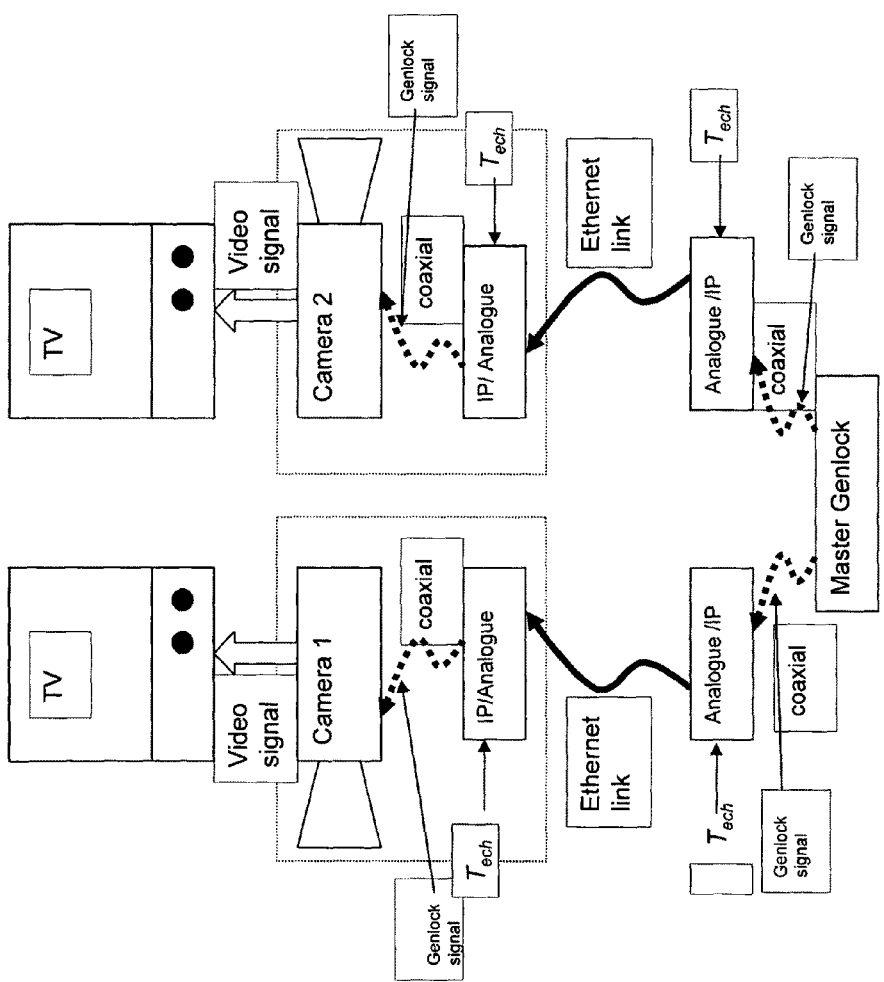
FIG. 4 shows the interfacing between an analogue domain and a IP/Ethernet network.

The current analogue domain is interfaced with the IP/Ethernet network on the transmission side, as shown in FIG. 4. The "Master Genlock" (transmission side) represented in FIG. 4 is connected to an Analogue/IP interface and the cameras 1 and 2 (reception side) represented in FIG. 4 are connected to an IP/Analogue interface. These interfaces will eventually be included in the items of equipment themselves.

A $T_{ech}$ is generated from a first synchronisation layer, for example IEEE 1588. The PTP protocol based on 1588 enables acquisition of synchronisation between the items of equipment connected on the Ethernet network to an order of microseconds. In other words, all the time bases of every item of equipment progress at the same time with an accuracy approaching the order of microseconds. Each of these time bases can be used in this case to generate its own $T_{ech}$ cue. Use of the 1588 layer is not a required route. Any system capable of providing one of the $T_{ech}$ cues to the various items of equipment on the network could be suitable. Typically, a first application functions with a 5 ms period cue from a wireless transmission physical layer.

Figure 5:
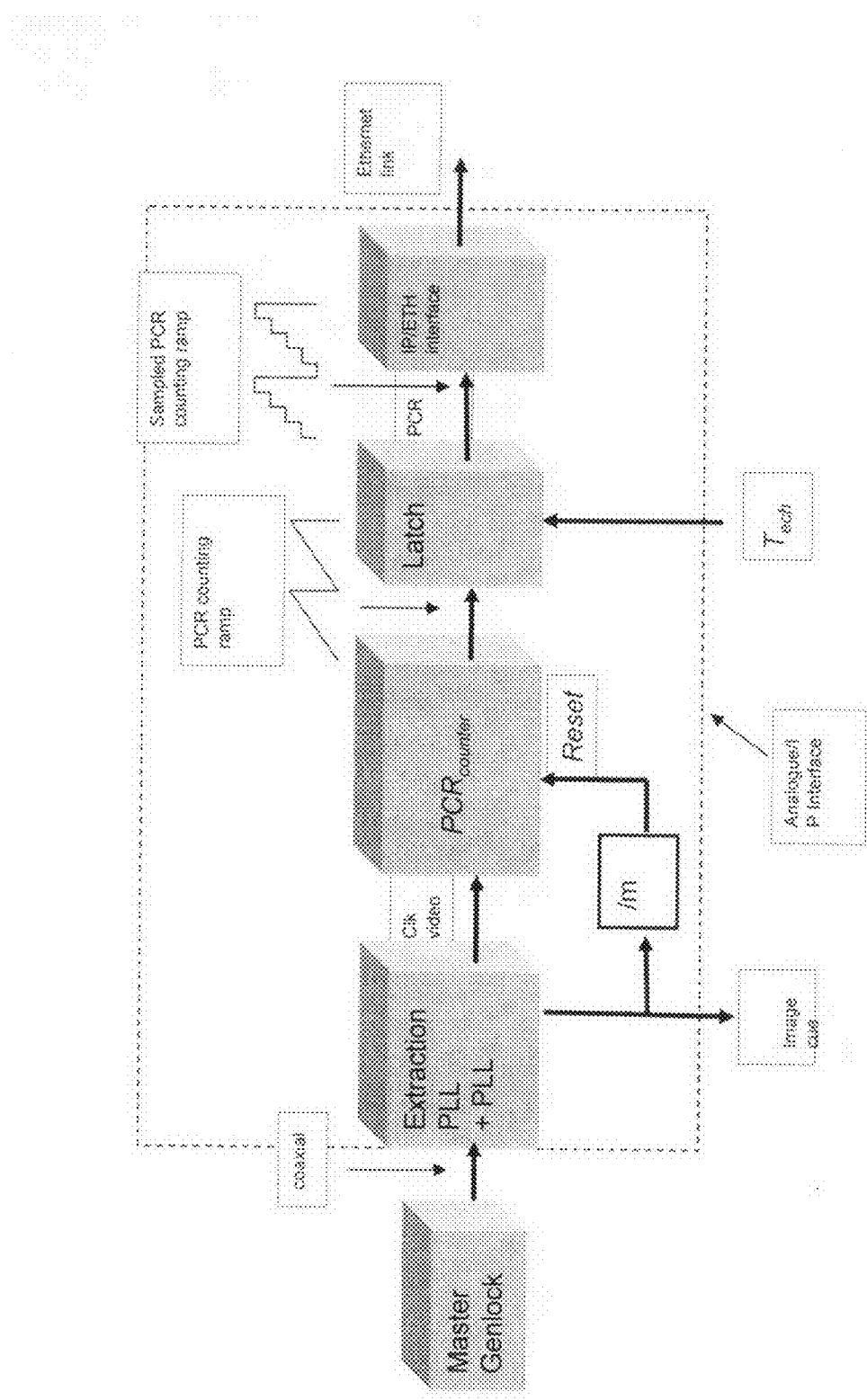
FIG. 5 shows an analogue/IP-Ethernet interface on the transmission side.

Starting with the genlock input signal from the master Genlock, shown in FIG. 5, information is extracted ("Phase Lock Loop") in order to recover a cadence video clock (noted as Clk on FIG. 5) for the PCR counter. The extraction part is charged with the generation of an image cue at the beginning of each image. All of the "m" images, of the PCR ("Program Clock Reference") counter are reset at 0. The output of the counter progresses according to the counting ramp modulo 40 ms. The PCR counter output is then sampled at every $T_{ech}$ period. The PCR samples are transmitted on the Ethernet network to the reception side that, from this information, will be charged with reconstructing the initial genlock signal rigorously in phase. The first 40 ms counter is included in the "Extraction PLL" block of FIG. 5.

Figure 6:
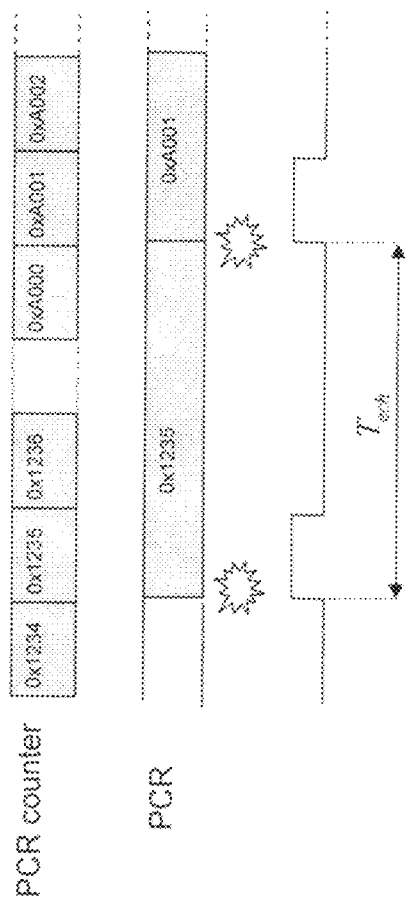
FIG. 6 represents the sampling of the PCR counter by $T_{ech}$.

FIG. 6 represents the sampling of the PCR counter by $T_{ech}$.

Figure 7:
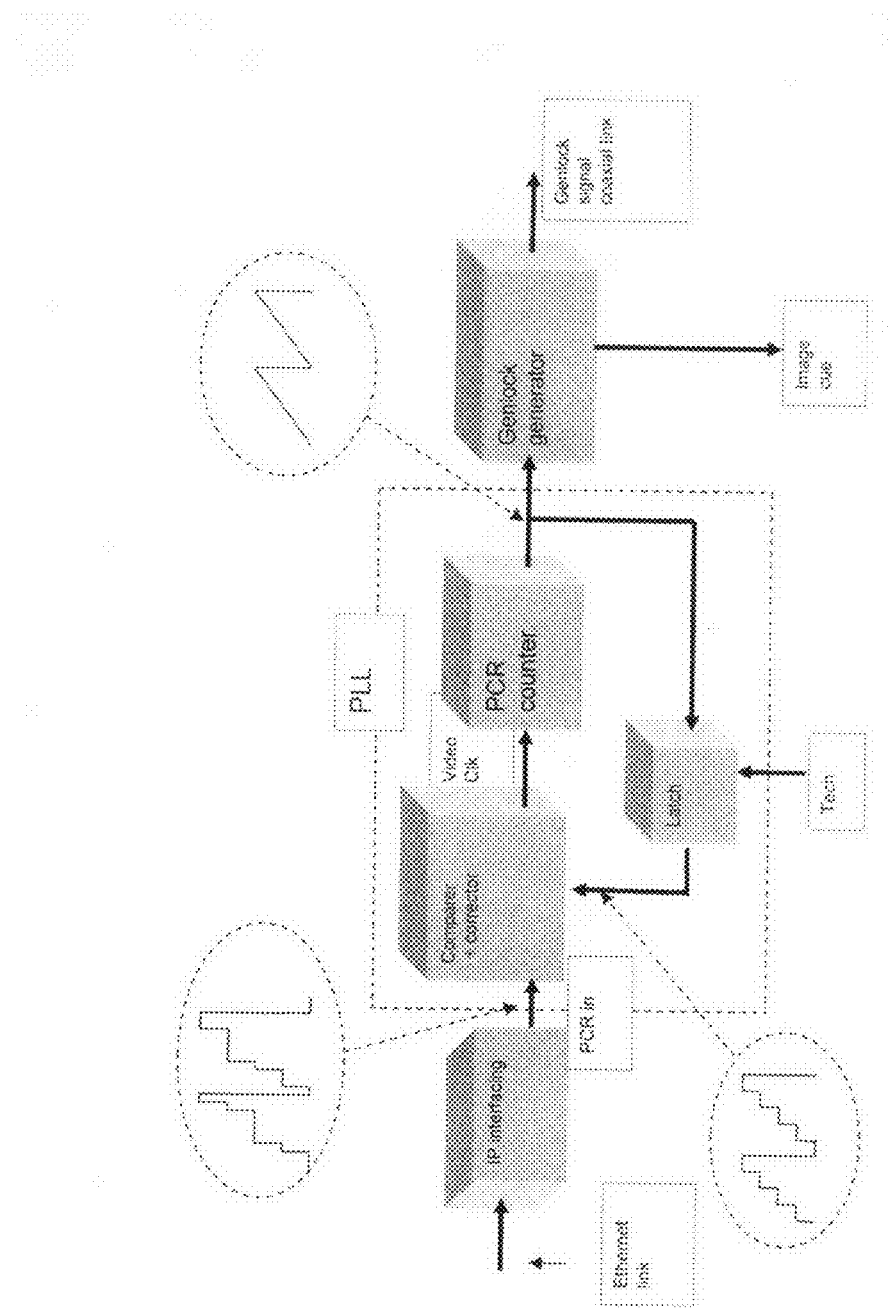
FIG. 7 shows the generation of the genlock signal on the reception side.

On the reception side, it is necessary to recuperate the PCR and reconstruct the genlock signal. As illustrated in FIG. 7, the PCR information arrives by Ethernet link. These PCRs, sampled on the transmission side at regular $T_{ech}$ intervals arrive at irregular intervals on the reception side, this being due generally to jitter introduced by the transport of PCR by IP. These samples (PCR) are re-taken into account at regular Tech intervals and hence, the majority of the jitter introduced during packet transport is eliminated. The PLL provides additional filtering. A regular 40 ms modulo ramp is thus found at the output of the PCR counter. The second 40 ms counter is included in the "Genlock Generator" block of FIG. 7.

The characteristics of the PLL (Phase Locking Loop) guarantee a clock with a minimum of jitter. The PCR counting ramps on the transmission and reception side are rigorously in phase to the nearest clock reading. The problem of rhythm recovery is resolved in this way. The major constraint for this to be achievable is that the sampling instants of the PCR counters at transmission and at reception be identical.

The imprecision between the transmission and reception sampling instants is absorbed by the PLL whose bandwidth is appropriated. This is equivalent to having identical sampling instants with a higher jitter at the PCR input, jitter filtered by the PLL.

The technical problem posed to those skilled in the art is the problem consisting in generating or transmitting an image cue via an IP/Ethernet network (introducing a strong jitter) rigorously in phase with the transmission and perfectly synchronised with the clock on the reception side. As soon as this can be realised, the construction of a genlock signal is possible.

Figure 8:
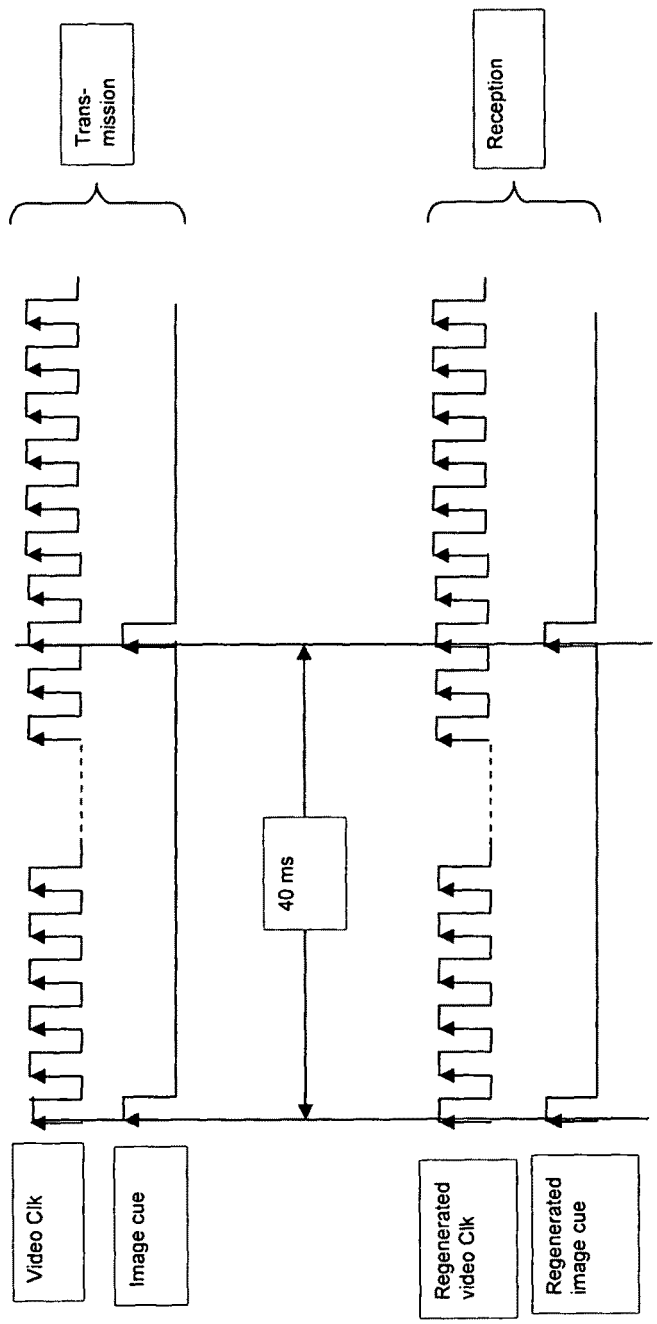
FIG. 8 shows an objective to be attained by means of the present invention.
Figure 9:
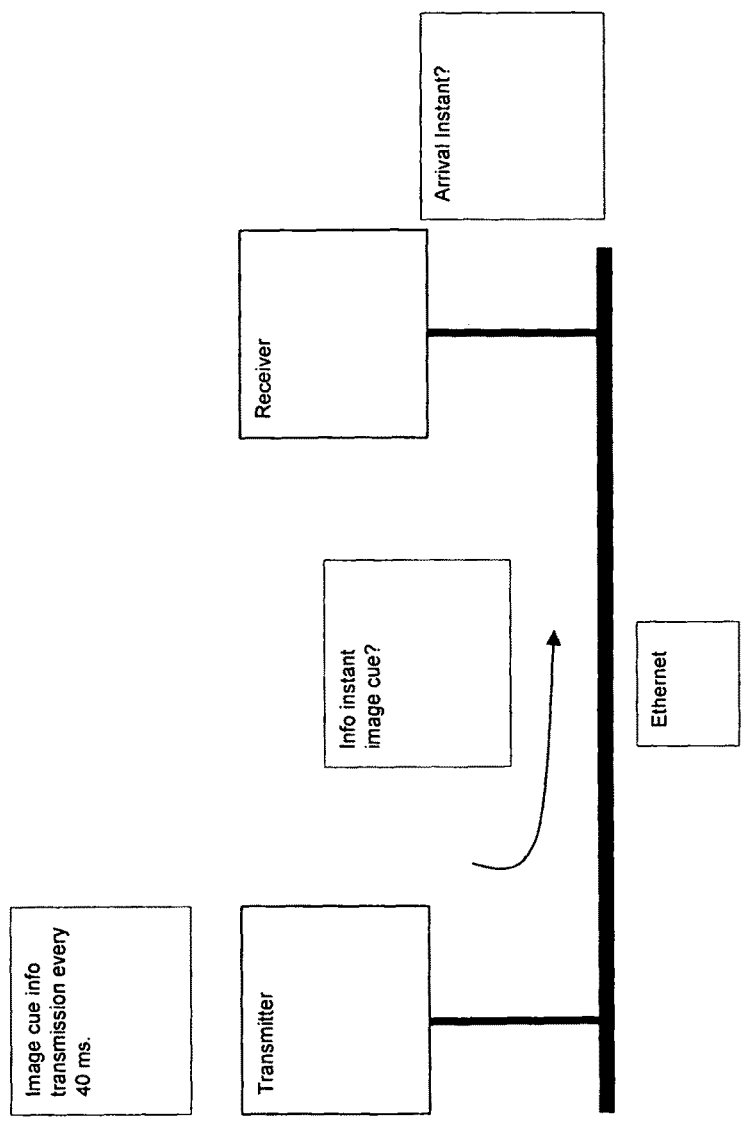
FIG. 9 shows the transmission of a potential image cue information.

FIG. 8 shows an objective to be attained by means of the present invention,

FIG. 9 shows the transmission of a potential image cue information, The transmission of an IP packet containing any type of information cannot arrive at the correct instant (latency, jitter, network, etc.) and is therefore not a good solution.

Figure 10:
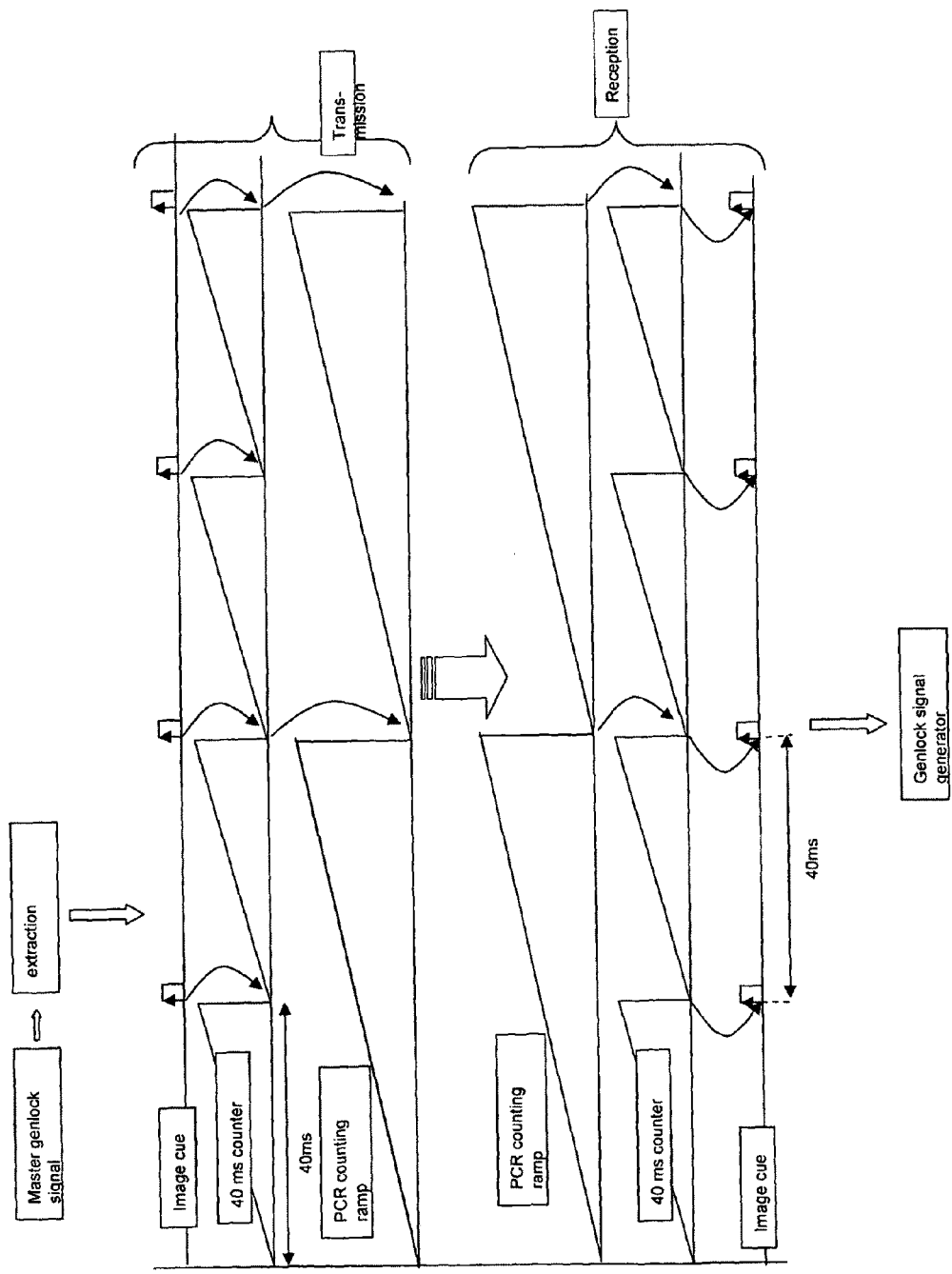
FIG. 10 represents the PCR and 40 ms counting ramps on the transmission side and the reception side.

As is illustrated in FIG. 10, the PCR counting ramps progress with a 40 ms modulo at transmission and reception. In this way, these ramps offer the possibility of recovering the video clock.

Transmission Side:

From the genlock signal, the image cue is extracted. From the 40 ms recurrent image cue, the 40 ms counter is initialised. At every "m" passage to zero of the 40 ms counter, the PCR counter is set to zero.

Reception Side:

The PCR counting ramp is regenerated by the PLL in phase with the counting ramp on the transmission side. When this PCR ramp passes through zero, the 40 ms counter is initialised and thereafter progresses freely. This latter necessarily remains synchronous with the PCR counter as both are using the same clock regenerated by the PLL. The passage through zero of the 40 ms counter enables the image cue to be generated. It is then possible to reconstruct the final genlock signal with this information on the reception side.

As the PCR counting ramps are rigorously synchronous, the ms counters on the transmission and reception sides are also synchronous and therefore the transmission and reception image cues are necessarily in phase. In addition, the image cue on the reception side has no jitter with respect to the video clock on the reception side.

Figure 11:
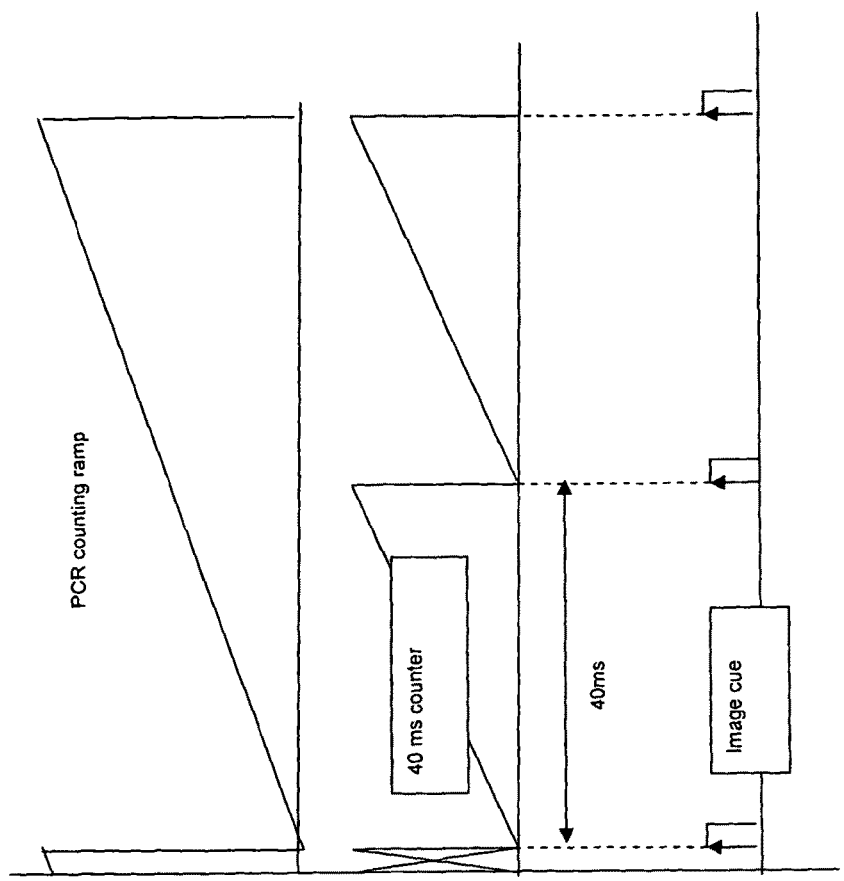
FIG. 11 shows the PCR and 40 ms counting ramps on the reception side.

In the case where the locking time of the PLL is long (very low bandwidth), it may be necessary to have time of the order of several tenths of a second for the duration of the PCR counting ramp. Waiting for the end of the PCR counting range to reset the 40 ms counter to zero poses, in this case a problem that can be easily overcome by a transmission of PCR values near the end of the PCR counting, during the system restart phase, as shown in FIG. 11.

The invention is described in the preceding text as an example. It is understood that those skilled in the art are capable of producing variants of the invention without leaving the scope of the patent.

The invention claimed is:

1. Device able to emit packets in a packet communication network comprising at least two stations, wherein the device comprises:

Means for extracting image cues from a synchronisation signal;

Means for initializing a first counter from said image cues;

Means for initializing a second counter at every "m" passage through zero of the first counter, m being an integer greater than or equal to two;

Means for sampling the second counter at every $T_{ech}$ period to obtain samples of the second counter, where $T_{ech}$ is derived from a time base synchronised on the at least two stations of said network; and Means for emitting packets containing the samples in the network, wherein said network introduces jitter to the emitted packets resulting in fluctuations in length of transmission time for the packets.

2. Device able to emit packets in a communication network according to claim 1, wherein the synchronisation signal is of the Genlock type.

3. Device able to emit packets in a communication network according to claim 1, wherein the second counter is a PCR ("Program Clock Reference") counter.

4. Device able to emit packets in a communication network according to claim 2, wherein the second counter is a PCR ("Program Clock Reference") counter.

5. Device able to emit packets in a communication network according to claim 1, wherein the time base synchronised on the at least two stations is of the IEC 61588 type.

6. Device able to receive packets in a packet communication network comprising at least two stations, wherein the device comprises:

Means for receiving packets containing samples from said network, said samples coming from data sampled every $T_{ech}$ period, where $T_{ech}$ is derived from a time base synchronised on the at least two stations of said network, wherein said network introduces jitter to the packets resulting in fluctuations in length of transmission time for the packets;

Means for regenerating a first counter using a phase locking loop;

Means for initialising a second counter at every passage through zero of said first counter;

Means for generating image cues at every passage through zero of the second counter; and Means for reconstituting a synchronisation signal from said image cues, wherein said samples include sets of samples, each set indicating a different one of said image cues, and the means for regenerating further comprises means for reconfiguring the samples in each set of samples based on $T_{ech}$ to correct for jitter imposed by the packet communication network.

7. Device able to receive packets in a communication network according to claim 6, wherein the synchronisation signal is of the Gen lock type.

8. Device able to receive packets in a communication network according to claim 7, wherein that the first counter is a PCR ("Program Clock Reference") counter.

9. Device able to receive packets in a communication network according to claim 6, wherein the time base synchronised on the at least two stations is of the IEC 61588 type.

10. Device able to emit packets in a communication network according to claim 1, wherein said means for sampling further comprises means for sampling the second counter repeatedly between each initialization of the second counter to generate a plurality of the samples for each of the "m" passages through zero of the first counter for emission in said packets.

11. Device able to emit packets in a communication network according to claim 1, wherein $T_{ech}$ is constant across each of the periods.

12. Device able to receive packets in a communication network according to claim 6, wherein $T_{ech}$ is constant across each of the periods.

* * * * *